US012241487B2

(12) United States Patent
Hu et al.

(10) Patent No.: US 12,241,487 B2
(45) Date of Patent: Mar. 4, 2025

(54) PNEUMATIC AND CABLE-DRIVEN HYBRID ARTIFICIAL MUSCLE

(71) Applicant: The University of Hong Kong, Hong Kong (HK)

(72) Inventors: Yong Hu, Hong Kong (HK); Xiao Dong Li, Hong Kong (HK); De Hao Duan Mu, Hong Kong (HK); Xiao Jun Wang, Hong Kong (HK); Xiang Cao, Shenzhen (CN)

(73) Assignee: The University of Hong Kong, Hong Kong (HK)

(*) Notice: Subject to any disclaimer, the term of this patent is extended or adjusted under 35 U.S.C. 154(b) by 0 days.

(21) Appl. No.: 18/480,529

(22) Filed: Oct. 4, 2023

(65) Prior Publication Data

US 2024/0141929 A1 May 2, 2024

(30) Foreign Application Priority Data

Oct. 26, 2022 (CN) ......................... 202211317558.3
Oct. 26, 2022 (CN) ......................... 202222828206.6

(51) Int. Cl.
*F15B 15/10* (2006.01)
*F15B 11/064* (2006.01)
*F15B 15/08* (2006.01)

(52) U.S. Cl.
CPC .......... *F15B 15/103* (2013.01); *F15B 11/064* (2013.01); *F15B 15/084* (2013.01)

(58) Field of Classification Search
CPC ........... F15B 15/103; B25J 9/104; B25J 9/142
See application file for complete search history.

(56) References Cited

U.S. PATENT DOCUMENTS 4,995,196 A * 2/1991 Smith .................. E06B 7/2318 49/477.1
5,181,452 A * 1/1993 Immega .................. B25J 18/06 92/92

(Continued)

FOREIGN PATENT DOCUMENTS

CN 111203912 A * 5/2020 ............. B25J 18/06
CN 212394993 U 1/2021

(Continued)

*Primary Examiner* — Thomas E Lazo
(74) *Attorney, Agent, or Firm* — IDEA Intellectual Limited; Margaret A. Burke; Sam T. Yip

(57) ABSTRACT

This invention discloses a pneumatic and cable-driven hybrid artificial muscle, comprising pneumatic actuator, pneumatic pressure regulating assembly, and cable drive assembly. The pneumatic pressure regulating assembly is connected to the pneumatic actuator to regulate air pressure in the pneumatic actuator for controlling the pneumatic actuator to extend or contract. The cable actuation assembly comprises a cable fixedly connected to the pneumatic actuator for controlling the pneumatic actuator to contract. In this invention, the artificial muscle employs a dual pneumatic and cable actuation mechanism. By leveraging the inherent stiffness of the pneumatic actuator, it can provide substantial actuation force for joint movement. Simultaneously, the cable actuation assembly can provide significant pulling force, effectively ensuring safety in human-machine interaction and offering sufficient bidirectional aiding force to individuals with disabilities who use the artificial muscle as an aiding actuation device.

9 Claims, 17 Drawing Sheets

(56) References Cited

U.S. PATENT DOCUMENTS

| | | | | |
|---|---|---|---|---|
| 5,317,952 | A * | 6/1994 | Immega | F15B 15/10 901/22 |
| 10,562,180 | B2 * | 2/2020 | Telleria | F16J 3/04 |
| 2018/0163371 | A1 * | 6/2018 | Cho | F15B 15/1452 |
| 2022/0193891 | A1 * | 6/2022 | Karydis | B25J 18/06 |

FOREIGN PATENT DOCUMENTS

| | | | |
|---|---|---|---|
| CN | 114102569 | A | 3/2022 |
| CN | 114102569 | B | 8/2022 |

* cited by examiner

PNEUMATIC AND CABLE-DRIVEN HYBRID ARTIFICIAL MUSCLE

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATIONS

The present application claims priority from the Chinese Invention Patent Application No. 202211317558.3 and the Chinese Utility Model Patent Application No. 202222828206.6, both filed on 26 Oct. 2022. The disclosures of which are incorporated herein by reference in their entireties.

FIELD OF THE INVENTION

This invention belongs to the field of rehabilitative medical equipment and specifically relates to a pneumatic and cable-driven hybrid artificial muscle.

BACKGROUND OF THE INVENTION

Currently, in the field of medical rehabilitation, flexible robotic devices primarily use pneumatic or cable-driven artificial muscles to actuate artificial exoskeleton systems. However, both pneumatic and cable-driven artificial muscles have their limitations when used alone as an actuation mechanism.

Pneumatic artificial muscles can achieve substantial pushing force by enlarging the muscle's outer wall and adjusting internal air pressure. However, their limited rigidity and compression capabilities of flexible materials make it challenging to provide significant pulling force. On the other hand, cable-driven muscle actuator can only provide unidirectional pulling force. If they are used on a joint that requires motion in both directions, two cable-driven muscle actuators would be needed. Additionally, cable-driven muscle actuators lack structural rigidity and cannot serve as structural support assembly.

For medical rehabilitation applications, flexible exoskeleton rehabilitation robots need to provide both structural support and aiding force during active joint movements. Existing artificial flexible exoskeletons struggle to meet both of these requirements simultaneously, resulting in limited practicality.

SUMMARY OF THE INVENTION

The main objective of this invention is to provide a pneumatic and cable-driven hybrid artificial muscle to address the issue that existing artificial flexible exoskeletons cannot simultaneously provide structural support and aiding force.

To address the technical problem mentioned above, the present invention provides a technical solution as follows:

A pneumatic and cable-driven hybrid artificial muscle comprising a pneumatic actuator, a pneumatic pressure regulating assembly, and a cable actuation assembly. The pneumatic pressure regulating assembly is connected to the pneumatic actuator to regulate air pressure in the pneumatic actuator for controlling the pneumatic actuator to extend or contract. The cable actuation assembly comprises a cable fixedly connected to the pneumatic actuator for controlling the pneumatic actuator to contract.

In one possible embodiment, the pneumatic actuator comprises an inner extending tube, an outer extending tube, a first sealing cap, and a second sealing cap. The inner extending tube is nested within the outer extending tube. Each of the inner and outer extending tubes has a first end sealed with the first sealing cap, and each of the inner and outer extending tubes has a second end sealed with the second sealing cap to form a closed air chamber. The inner extending tube has an inner cavity in connection with external atmosphere through a central through-hole on the second sealing cap. The pneumatic pressure regulating assembly is connected to the air chamber, and the cable of the cable drive assembly has one end fixedly connected to the first sealing cap.

In one possible embodiment, the second sealing cap comprises: a circular groove opened from a surface of the second sealing cap proximal to the first sealing cap, located between the inner and outer extending tubes and being in connection with the air chamber; and an air hole located on a side wall of the second sealing cap and connected to the circular groove. The pneumatic pressure regulating assembly is connected to the air hole such that the pneumatic pressure regulating assembly can be in connection with the air chamber through the air hole and the circular groove.

In one possible embodiment, the pneumatic pressure regulating assembly includes a high-pressure pump connected to the air chamber for inflating air into the chamber and a vacuum pump connected to the chamber for evacuating air from the chamber.

In one possible embodiment, the pneumatic and cable-driven hybrid artificial muscle further includes a pneumatic duct assembly comprising a main air duct, a first branch air duct, and a second branch air duct. The main air duct is connected to the air hole. The high-pressure pump is connected to the main air duct through the first branch air duct. The first branch air duct has a high-pressure valve. The vacuum pump is connected to the main air duct through the second branch air duct. The second branch air duct has a vacuum valve.

In one possible embodiment, the pneumatic duct assembly further includes a third branch air duct having a flow control valve. The main air duct may be in connection with the external atmosphere through the third branch air duct.

In one possible embodiment, the cable actuation assembly further includes a motor. The flexible cable passes through the central through-hole and has one end fixed to the motor and the other end fixed to the first sealing cap centrally.

In one possible embodiment, both the inner and outer extending tubes are corrugated tubes.

In one possible embodiment, both the inner and outer extending tubes are made of TPU material.

In one possible embodiment, both the first sealing cap and second sealing cap are made of glass fiber-reinforced nylon material.

The beneficial effects of the above-mentioned technical solution are that the provided artificial muscle utilizes dual pneumatic and cable actuation mechanism. By leveraging the inherent stiffness of the pneumatic actuator, it can provide substantial actuation force for joint movement. Simultaneously, the cable actuation assembly can provide significant pulling force, effectively ensuring safety in human-machine interaction and offering sufficient bidirectional aiding force to individuals with disabilities who use the artificial muscle as an aiding actuation device.

BRIEF DESCRIPTION OF THE DRAWINGS

The accompanying drawings are provided to facilitate further understanding of the invention. The schematic illustration and relevant descriptions of embodiments are aimed to provide explanations for the invention and do not intend to constitute inappropriate limitations on the invention.

DETAILED DESCRIPTION

Figure 1:
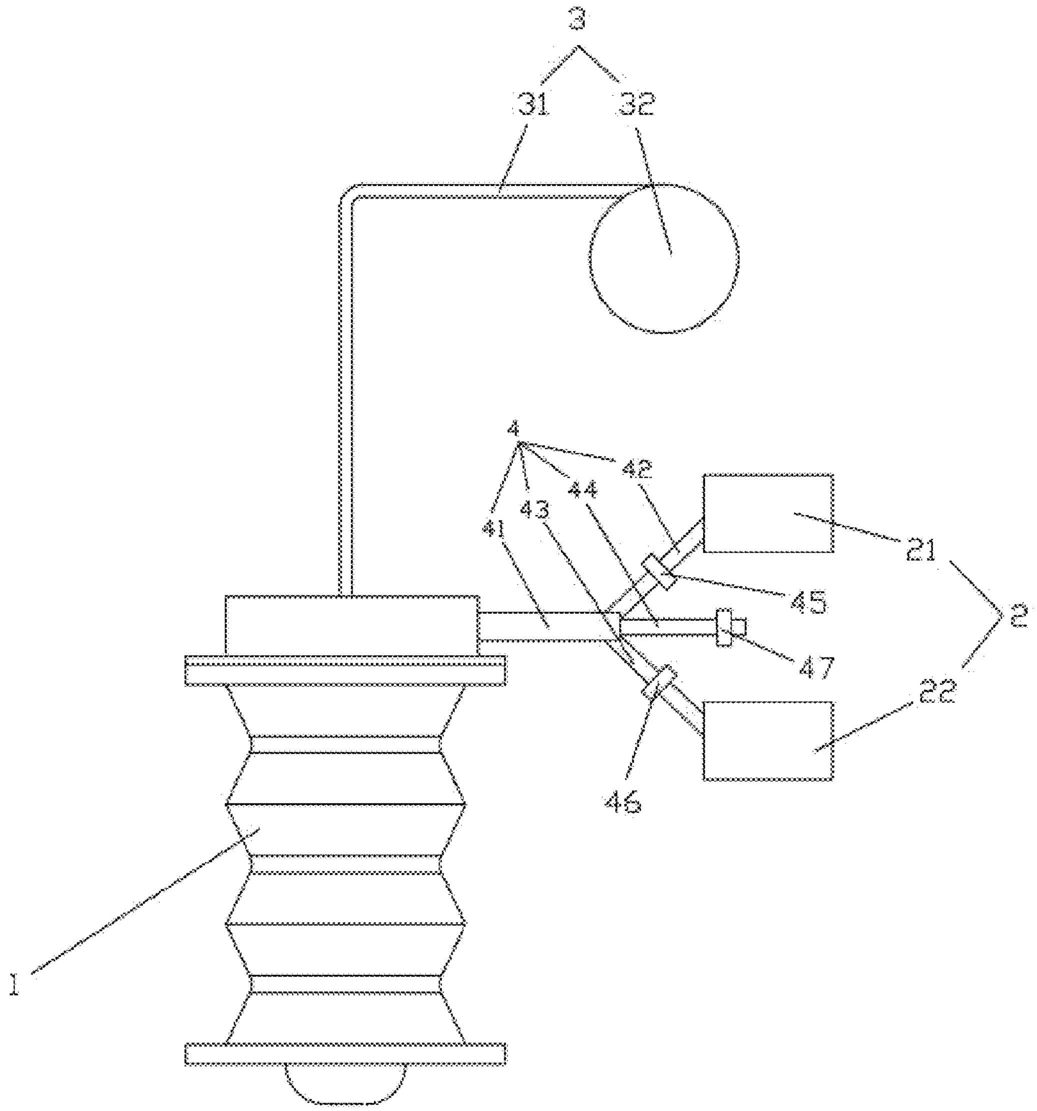
FIG. 1 shows a schematic diagram of a pneumatic and cable-driven hybrid artificial muscle according to one embodiment of the present invention.
Figure 2:
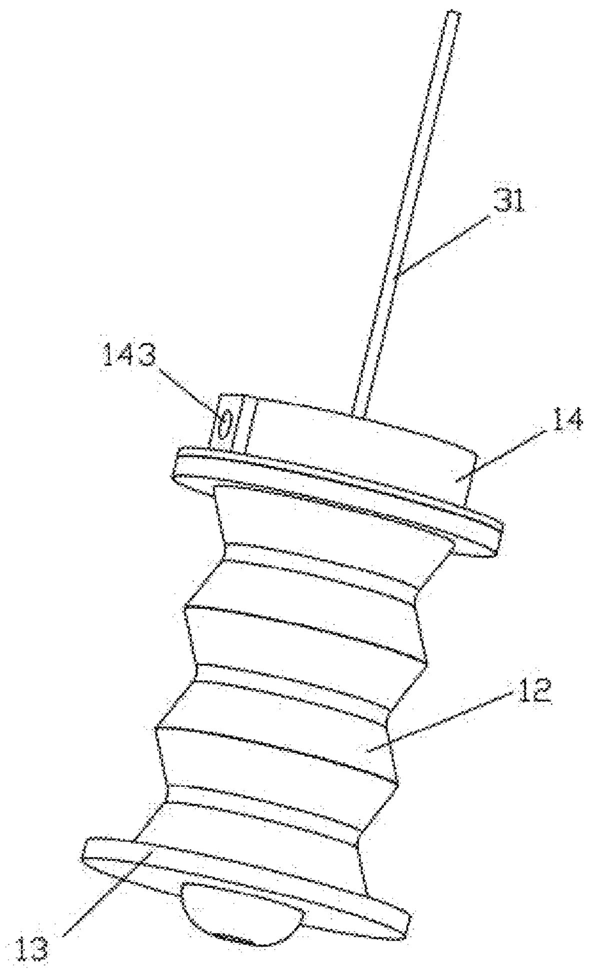
FIG. 2 shows a schematic diagram of a pneumatic actuator in a pneumatic and cable-driven hybrid artificial muscle according to one embodiment of the present invention.
Figure 3:
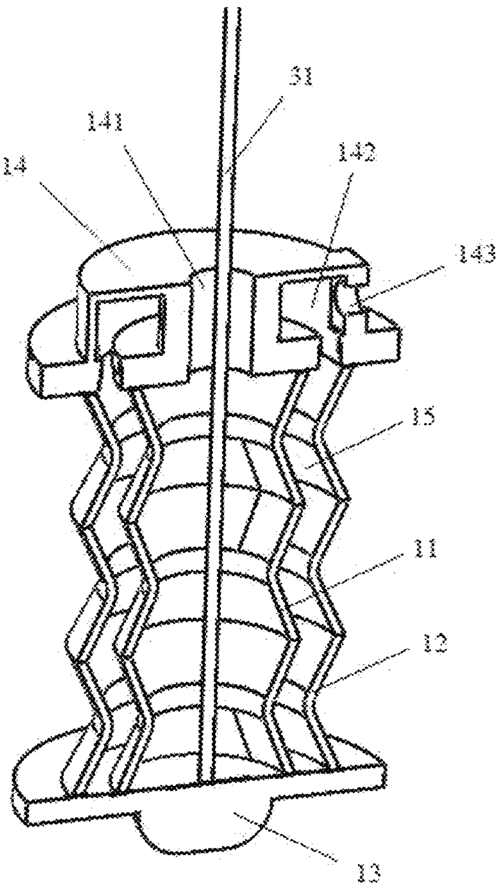
FIG. 3 shows a schematic diagram of internal structure of a pneumatic actuator in a pneumatic and cable-driven hybrid artificial muscle according to one embodiment of the present invention.
Figure 4:
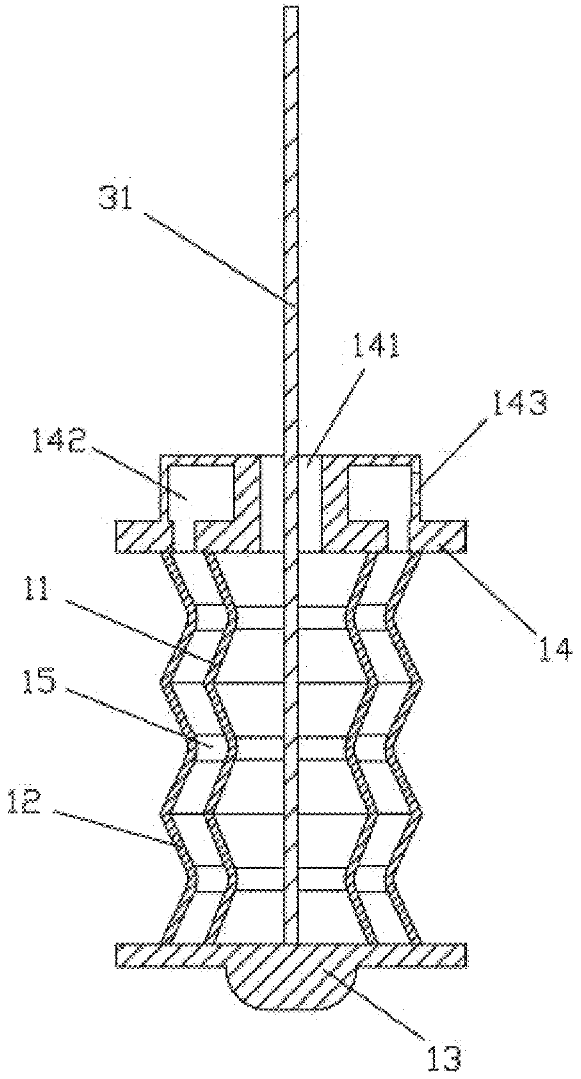
FIG. 4 shows is a cross-sectional view of a pneumatic actuator in a pneumatic and cable-driven hybrid artificial muscle according to one embodiment of the present invention.
Figure 5:
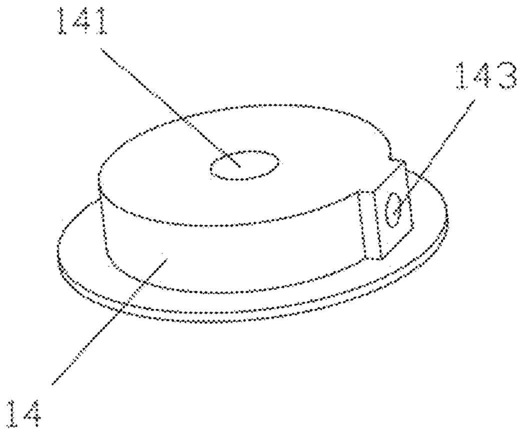
FIG. 5 shows is a schematic diagram of a second sealing cap in a pneumatic and cable-driven hybrid artificial muscle according to one embodiment of the present invention.
Figure 6:
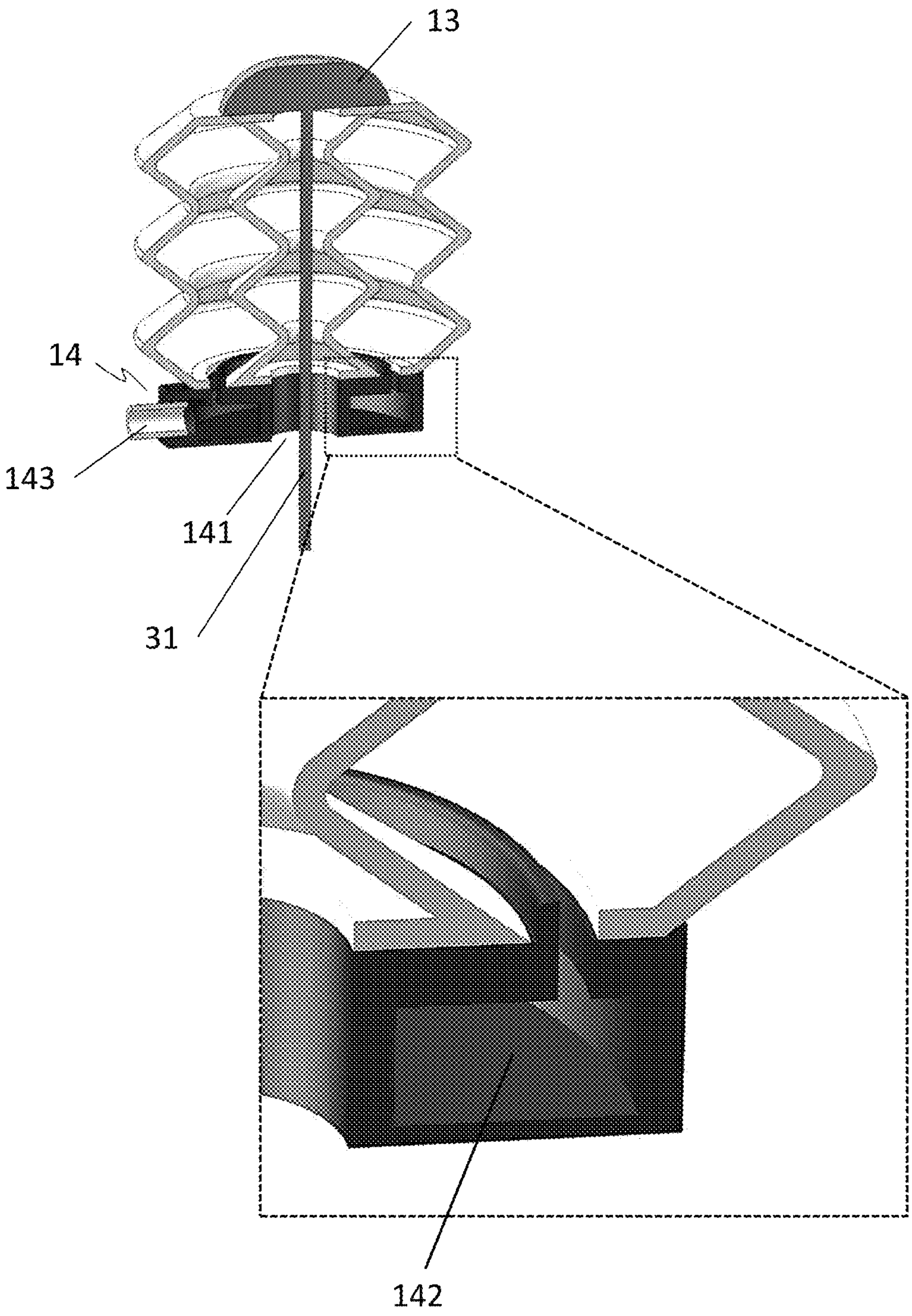
FIG. 6 shows a more detailed schematic diagram of the second sealing cap in a pneumatic and cable-driven hybrid artificial muscle according to one embodiment of the present invention.

In order to make the objectives, technical solutions, and advantages of the present invention clearer and more understandable, the following detailed description of the invention is provided in conjunction with specific embodiments. It should be understood that specific embodiments described here are for the purpose of explaining the invention and are not intended to limit the scope of the invention.

In the description of the present invention, it should be noted that terms such as "vertical," "horizontal," "longitudinal," "front," "rear," "left," "right," "up," "down," "horizontal," and similar directional or positional terms are based on the orientation or position relationship as shown in the drawings. These terms are used for descriptive purposes and do not imply that the devices or assembly must have specific orientations or positions. Therefore, they should not be construed as limitations on the present invention. The term "quantity" should also not be construed as limiting the present invention.

In the description of the present invention, it should be clarified that unless otherwise explicitly specified and limited, terms such as "installation," "connection," and "joining" should be broadly interpreted. For example, it can refer to fixed connections, detachable connections, or integral connections; it can be mechanical connections, electrical connections, direct connections, or indirect connections through an intermediate medium. For those skilled in the art, these terms can be understood in specific contexts.

It should be understood that each component of a device or each step of a method can be described using device terminology or method terminology. Such terminology can be replaced as needed to provide clarity to the scope of the invention. As an example, it should be understood that all steps of a method can be disclosed as actions, means for taking the actions, or assembly causing the actions. Similarly, each component of a device can be disclosed as a physical element or an action facilitated by the physical element. For example, the disclosure of a "connector" should be understood to encompass the disclosure of the "connection" action, regardless of whether it is explicitly discussed. Conversely, if the "connection" action is disclosed, it should be understood to encompass the disclosure of a "connector" and even devices "used for connection." These alternative terms for each component or step should be understood to be explicitly included in the specification.

Referring to FIG. 1, in accordance with one embodiment of the present invention, a pneumatic and cable-driven hybrid artificial muscle is provided. It includes a pneumatic actuator 1, a pneumatic pressure regulating assembly 2, and a cable actuation assembly 3. The pneumatic pressure regulating assembly 2 is connected to the pneumatic actuator 1 to adjust the air pressure in the pneumatic actuator 1 for controlling the pneumatic actuator 1 to extend or contract. The cable actuation assembly 3 is connected to the pneumatic actuator 1 for controlling the pneumatic actuator 1 to contract.

With the above technical solution, the artificial muscle provided by the present invention uses both pneumatic and cable drives. By leveraging the high rigidity of the pneumatic actuator 1, it can provide substantial actuation force for joint movements. Simultaneously, the cable actuation assembly 3 can provide significant pulling force, effectively ensuring safety in human-machine interaction. As a wearable flexible exoskeleton driver, it provides sufficient bidirectional aiding force to disabled individuals.

FIGS. 2 to 6 illustrate more details of the pneumatic and cable-driven hybrid artificial muscle of FIG. 1.

The pneumatic actuator 1 includes an inner extending tube 11, an outer extending tube 12, a first sealing cap 13, and a second sealing cap 14.

The inner extending tube 11 is nested inside the outer extending tube 12, preferably in a concentric arrangement. Each of the inner extending tube 11 and the outer extending tube 12 has a first end sealed to the first sealing cap 13, and a second end sealed to the second sealing cap 14, forming a sealed chamber 15 composed of the inner extending tube 11, outer extending tube 12, first sealing cap 13, and second sealing cap 14. The pneumatic pressure regulating assembly 2 is connected to the chamber 15 to adjust the air pressure in the pneumatic actuator 1, thereby achieving the extension or contraction of the pneumatic actuator 1.

When the air pressure in the chamber 15 increases, the pneumatic actuator 1 extends and generates a relatively large pushing force. When the air pressure in the chamber 15 decreases, the pneumatic actuator 1 contracts and generates a relatively low pulling force. In this case, the cable actuation assembly 3 is needed to provide additional pulling force.

Furthermore, to prevent the air pressure in the inner extending tube 11 from affecting the extension or contraction of the pneumatic actuator 1, and to make it work more efficiently, a central through-hole 141 is provided on the second sealing cap 14, allowing the inner extending tube 11 to be in connection with the external atmosphere.

Preferably, both the inner extending tube 11 and the outer extending tube 12 are made of corrugated tubes, which are able achieve synchronized extension and contraction. Preferably, the inner extending tube 11 and the outer extending tube 12 are integrally formed corrugated tubes. Preferably, both the inner extending tube 11 and the outer extending tube 12 are made of TPU material.

Figure 7A:
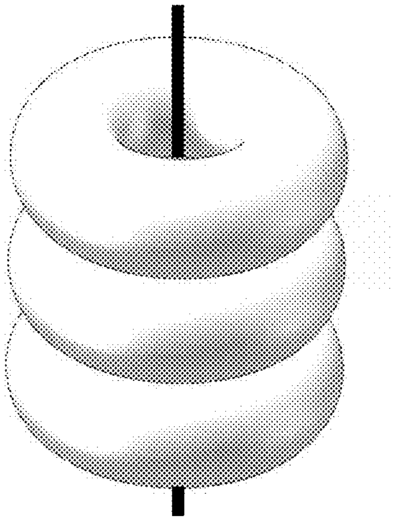
FIG. 7A shows a pneumatic actuator according to another embodiment of the present invention and FIG. 7B shows its cross-sectional view.
Figure 7B:
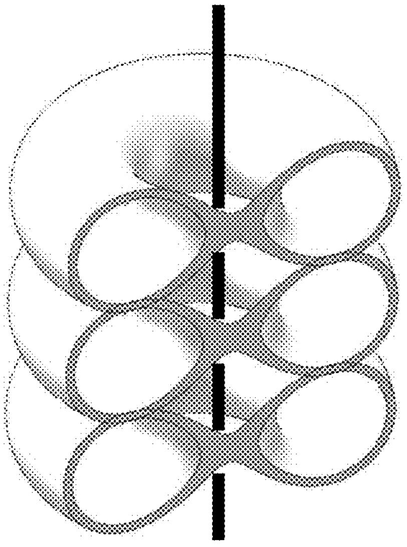

Alternatively, as shown in FIGS. 7A and 7B, the pneumatic actuator may be formed by stacking a plurality of doughnut shell-shaped chambers to have a multi-layer stacked doughnut structure.

Preferably, the first sealing cap 13 and the second sealing cap 14 are made of high-strength materials, such as glass-fiber-reinforced nylon material, and manufactured using a stereolithography 3D printer.

The second sealing cap 14 includes a circular groove 142 on a side proximal to the first sealing cap 13. The circular groove 142 is located between the inner extending tube 11 and the outer extending tube 12 and in connection with to the chamber 15. The second sealing cap 14 further includes an air hole 143 opened at a side wall of the second sealing cap 14 and configured to connected to the circular groove 142. The pneumatic pressure regulating assembly 2 is connected to pneumatic actuator 1 through the air hole 143.

The pneumatic pressure regulating assembly 2 includes a high-pressure pump 21 connected to the chamber 15 for inflating the chamber 15 and a vacuum pump 22 connected to the chamber 15 for extracting air from the chamber 15.

In one embodiment, the pneumatic and cable-driven hybrid artificial muscle further includes a pneumatic duct assembly 4. The pneumatic duct assembly 4 comprises a main air duct 41, a first branch air duct 42, and a second branch air duct 43. The main air duct 41 is connected to the air hole 143. The high-pressure pump 21 is connected to the main air duct 41 through the first branch air duct 42. The first branch air duct 42 has a high-pressure valve 45. The vacuum pump 22 is connected to the main air duct 41 through the second branch air duct 43. The second branch air duct 43 has a vacuum valve 46.

Preferably, the pneumatic duct assembly 4 further includes a third branch air duct 44. The main air duct 41 is connection with the external atmosphere through the third branch air duct 4. The third branch air duct 4 has a relief valve 47.

The cable actuation assembly 3 includes a flexible cable 31 and a motor 32 (e.g., a servo motor). The flexible cable 31 has one end fixed to the motor 32 and the other end fixed to a center of the first sealing cap 13. The flexible cable 31 is configured to pass through the central through-hole 141. To prevent the flexible cable 31 from interfering with the air passage through the central through-hole 141, the diameter of the central through-hole 141 is at least twice the diameter of the flexible cable 31.

When the motor 32 rotates in a direction of pulling the flexible cable 31, the flexible cable 31 transmits tension to control contraction of the pneumatic actuator 1. Conversely, when the motor 32 rotates in an opposite direction, the flexible cable 31 is slacken, and extension of the pneumatic actuator 1 is then mainly controlled by the pneumatic pressure regulating assembly 2.

Figure 8A:
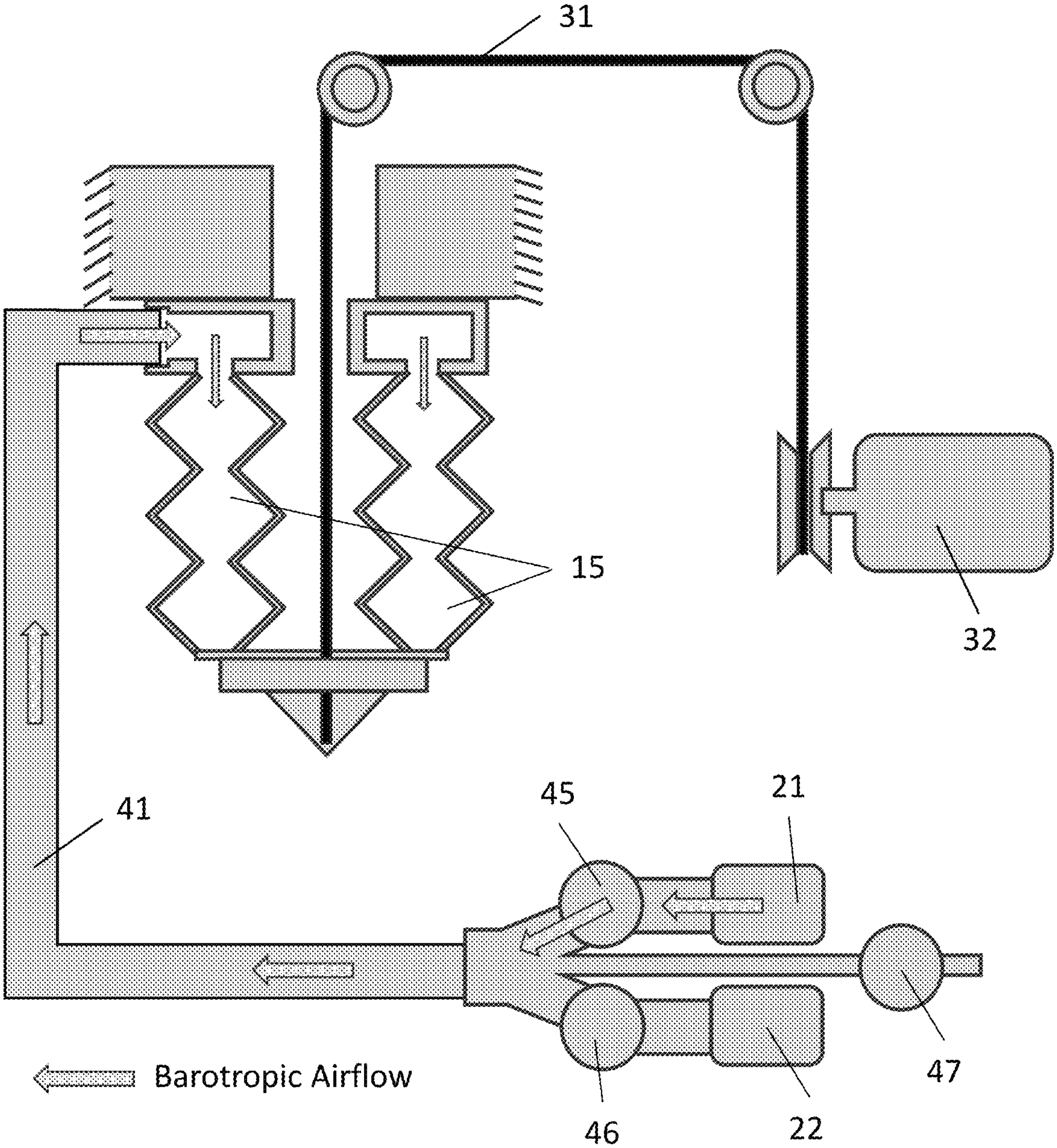
FIGS. 8A to 8C show different operation modes of a pneumatic and cable-driven hybrid artificial muscle according to one embodiment of the present invention.
Figure 8B:
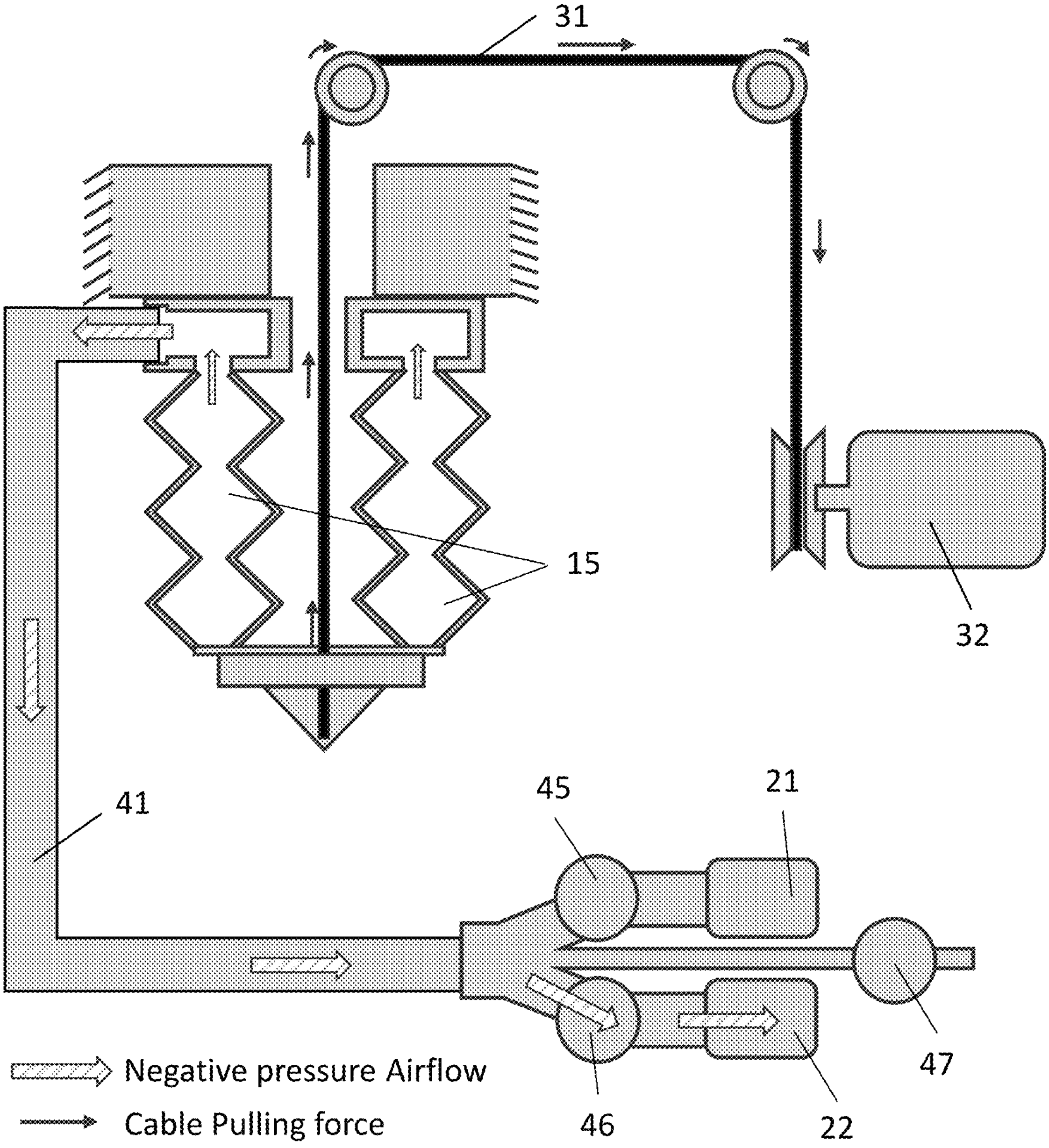
Figure 8C:
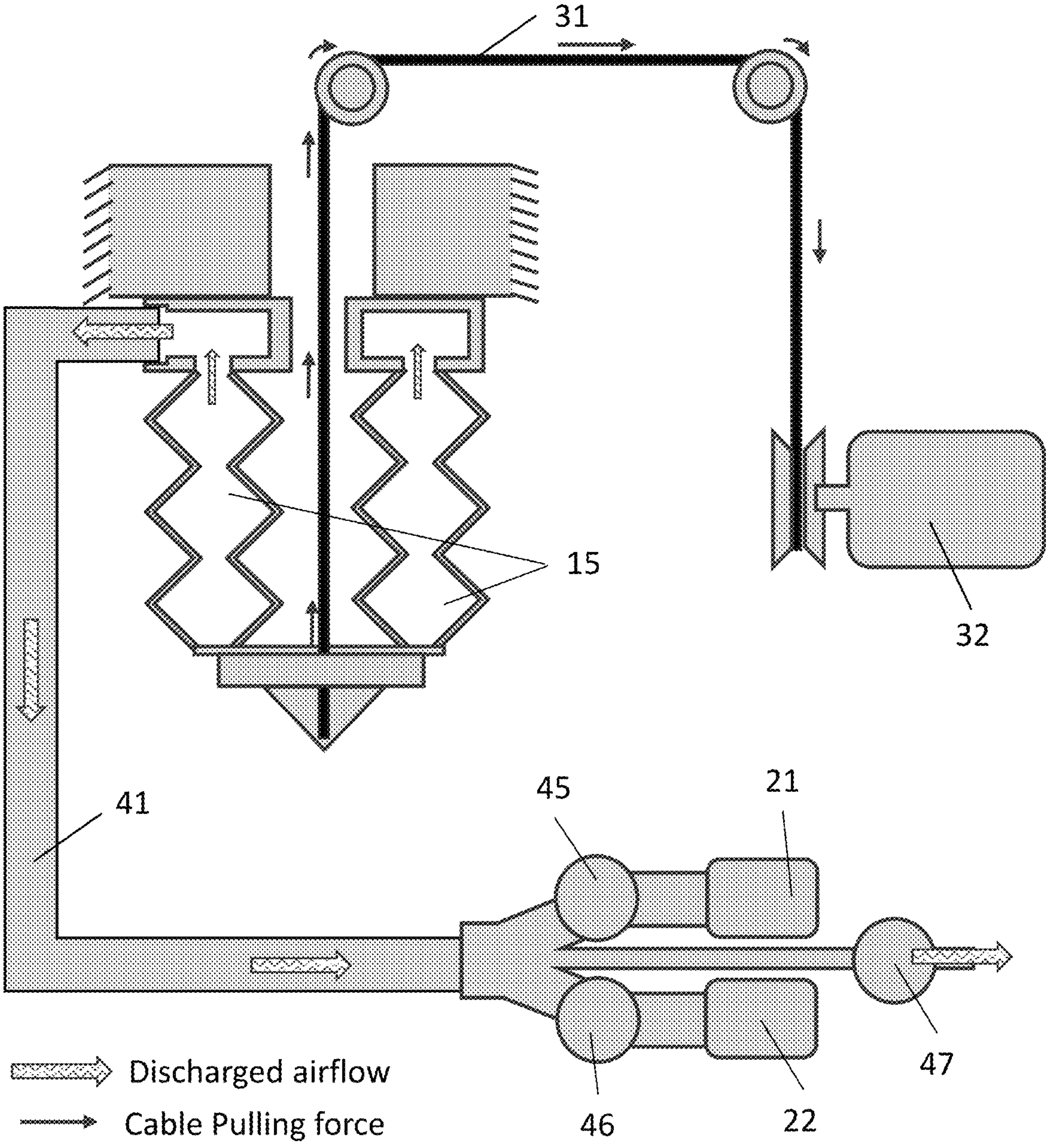
Figure 9A:
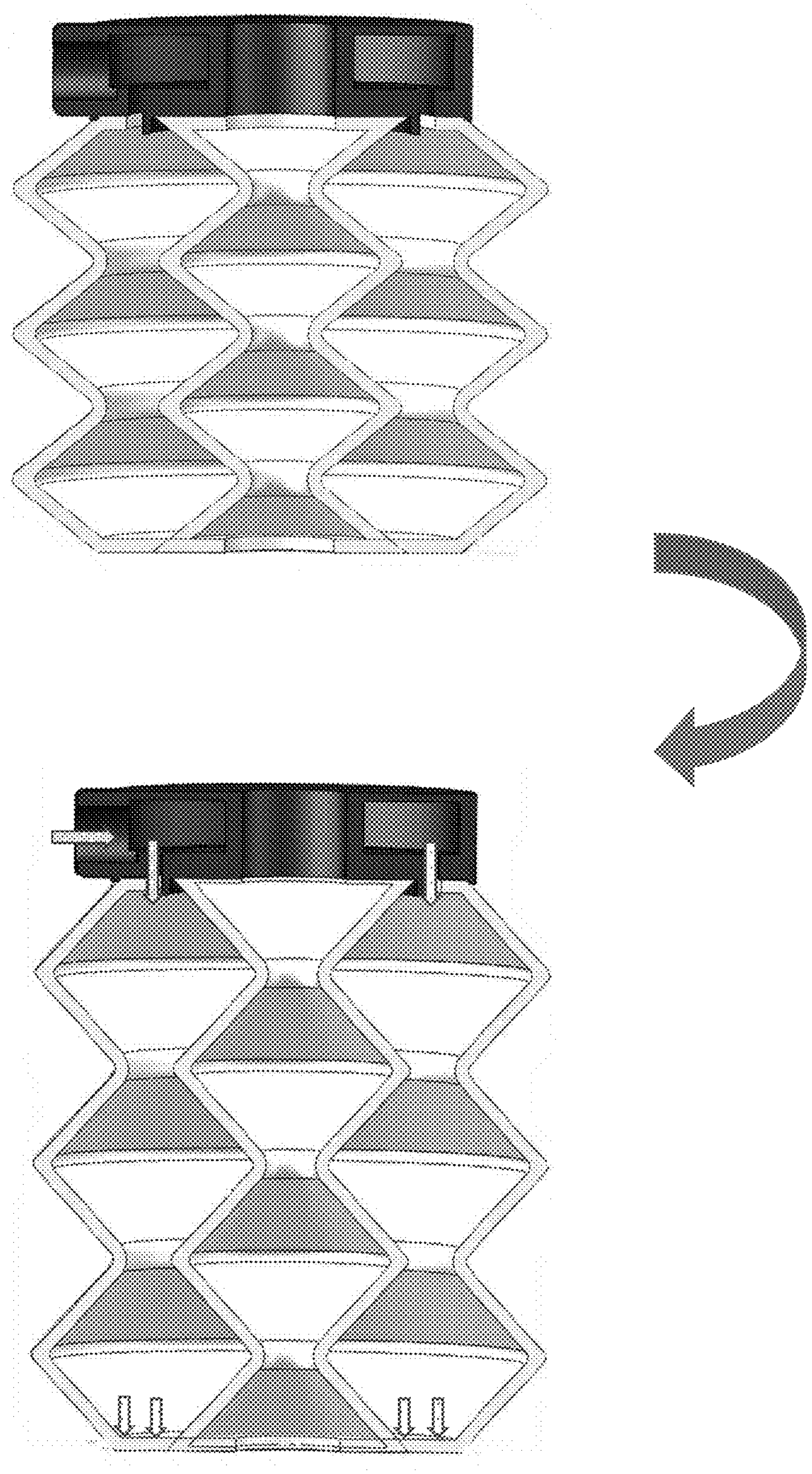
FIGS. 9A to 9C show different status of a pneumatic actuator in a pneumatic and cable-driven hybrid artificial muscle under different operation modes respectively.
Figure 9B:
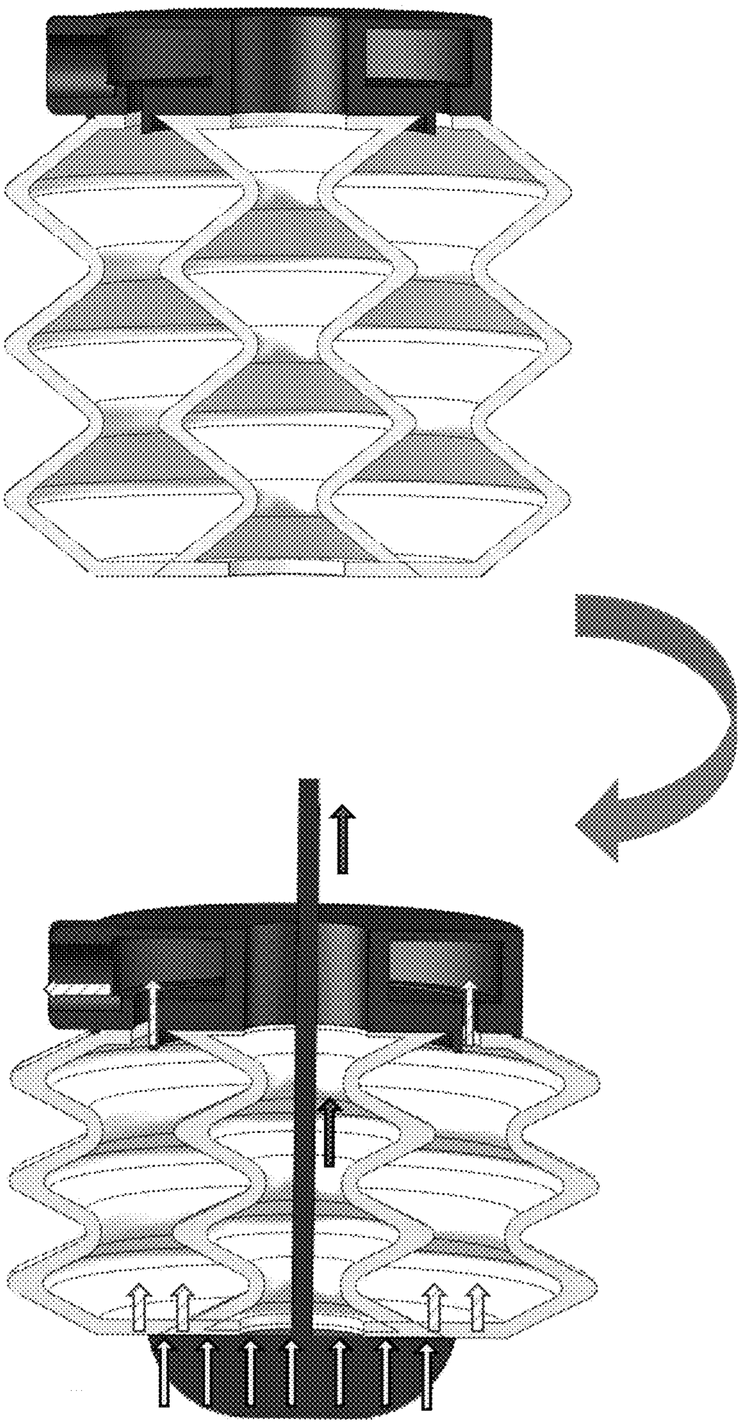
Figure 9C:
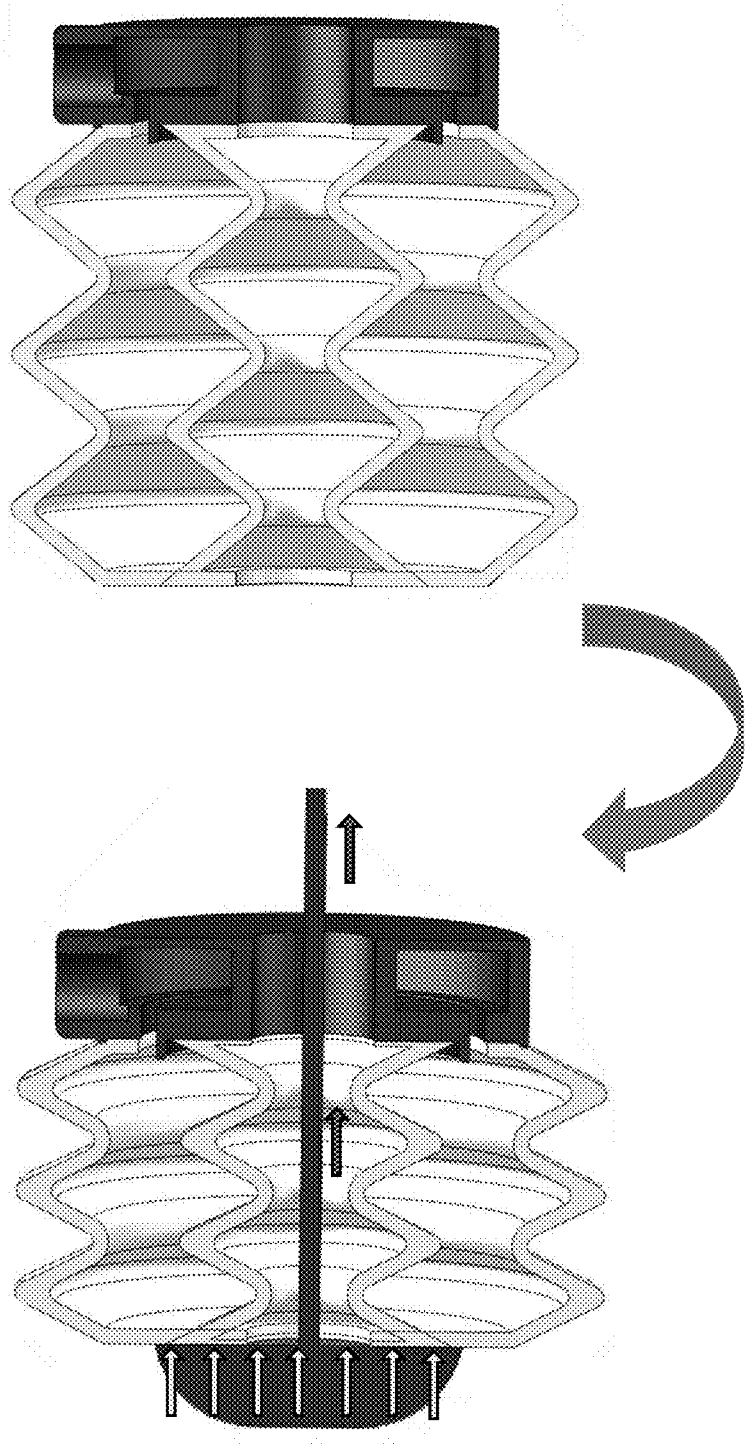
Figure 10A:
FIGS. 10A to 10D show various views of a pneumatic actuator prototype according to one embodiment of the present invention.
Figure 10B:
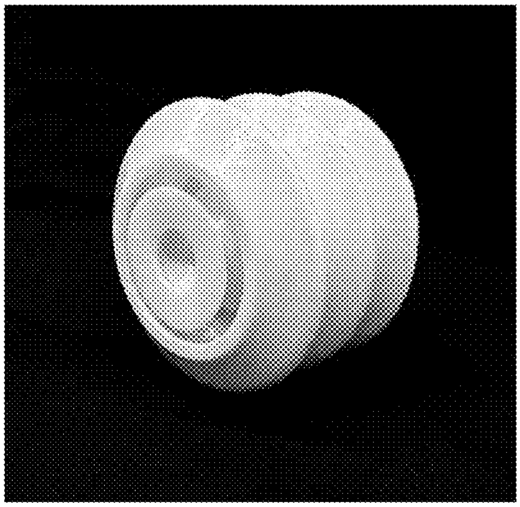
Figure 10C:
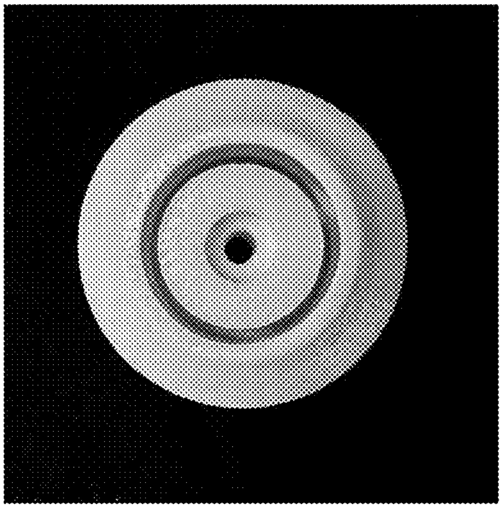
Figure 10D:
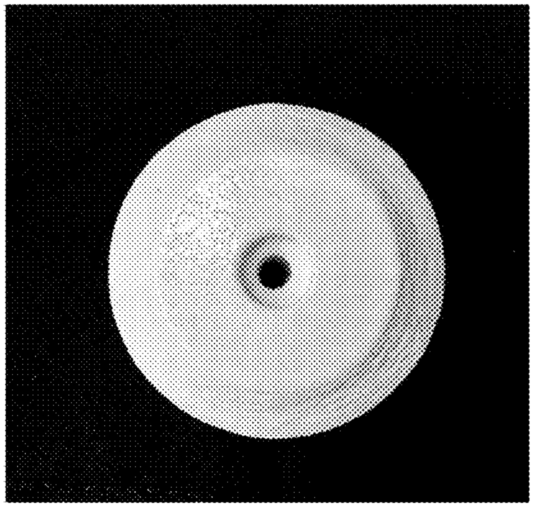

FIGS. 8A to 8C illustrate the operation mechanism of the pneumatic and cable-driven hybrid artificial muscle. FIGS. 9A to 9C show different status of the pneumatic actuator in the pneumatic and cable-driven hybrid artificial muscle under different operation modes respectively.

Referring to FIG. 8A, when the artificial muscle is required to provide a thrust, it is primarily controlled by the pneumatic pressure regulating assembly. The vacuum valve 46 and relief valve 47 are closed, and the high-pressure valve 45 is open. The high-pressure pump 21 generates a barotropic airflow through the high-pressure valve 45 to inflate the chamber 15. As a result, the air pressure in the chamber 15 is increased and the pneumatic actuator extends (as shown in FIG. 9A), generating a pushing force which constitute the entire required thrust. At this point, the motor 32 is in an inactive state, and the flexible cable 31 extends along with the extension of the pneumatic actuator.

When the artificial muscle is required to provide a pull, it is primarily controlled by the cable actuation assembly. In particular, the motor 32 is activated to retract the flexible cable 31 to generate a primary pulling force and the pneumatic pressure regulating assembly may be configured to operate in two cases.

Referring to FIG. 8B for the first case. The high-pressure valve 45 and relief valve 47 are closed, while the vacuum valve 46 is open. The vacuum pump 22 is activated to generate a negative pressure airflow to evacuate air from the chamber 15 through the vacuum valve 46. The air pressure inside the chamber 15 is reduced and the pneumatic actuator is compressed (as shown in FIG. 9B) to generate an auxiliary pulling force, which is typically relatively small, in addition to the primary pulling force generated by the cable actuation assembly.

Referring to FIG. 8C for the second case. The high-pressure valve 45 and vacuum valve 46 are closed, and the relief valve 47 is open, allowing the chamber 15 to be in connection with the external atmosphere. The pneumatic actuator is in an inactive state and does not generate any pulling force. Along with the retraction of the flexible cable 31, the pneumatic actuator is compressed (as shown in FIG. 9C) and the air inside the chamber 15 is discharged to external atmosphere through the relief valve 47.

The artificial muscle provided by the present invention utilizes a dual-drive system, combining pneumatic and cable-driven mechanisms. By leveraging the inherent stiffness of the pneumatic actuator 1, it can provide substantial actuation thrust for joint movements. Simultaneously, the cable actuation assembly 3 can supply significant driving pulling force. This effectively ensures safety in human-machine interactions and provides sufficient bidirectional aiding force for individuals with disabilities.

Figure 11A:
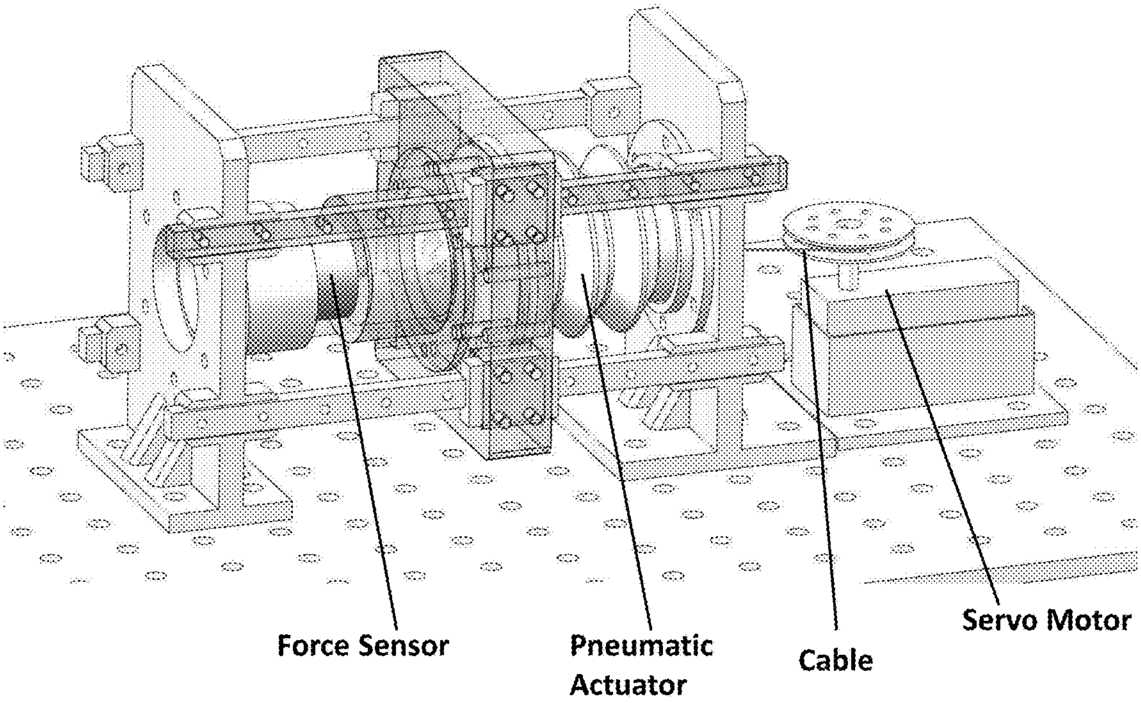
FIG. 11A shows a schematic diagram of an experimental setup for measuring forces generated by the artificial muscle protype under different operation modes.
Figure 11B:
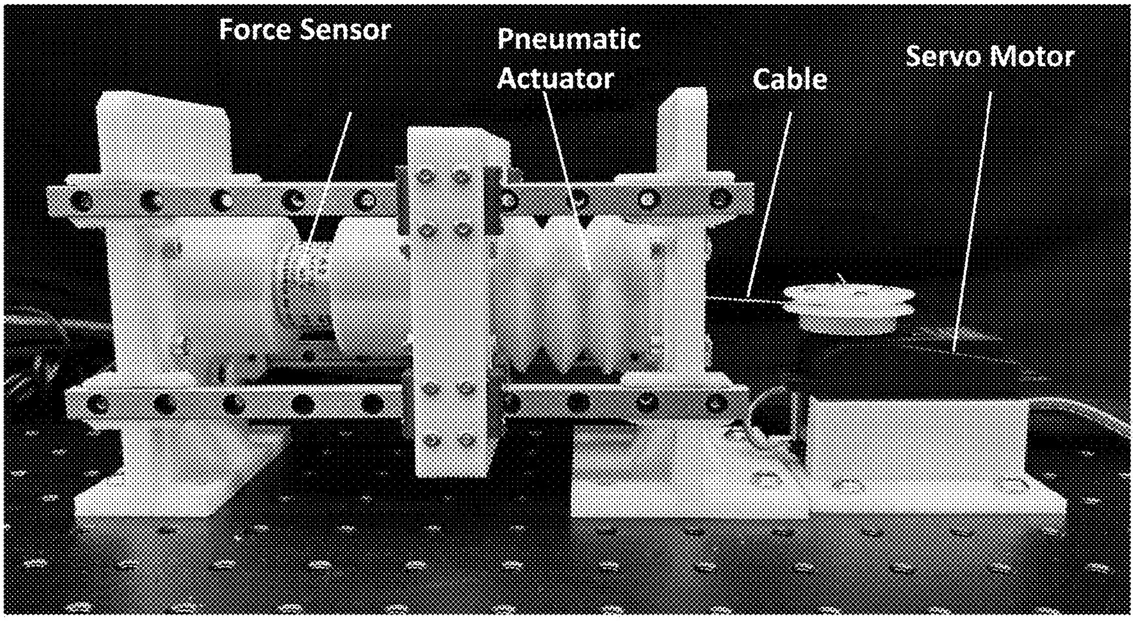
FIG. 11B shows a photo of the setup.
Figure 11C:
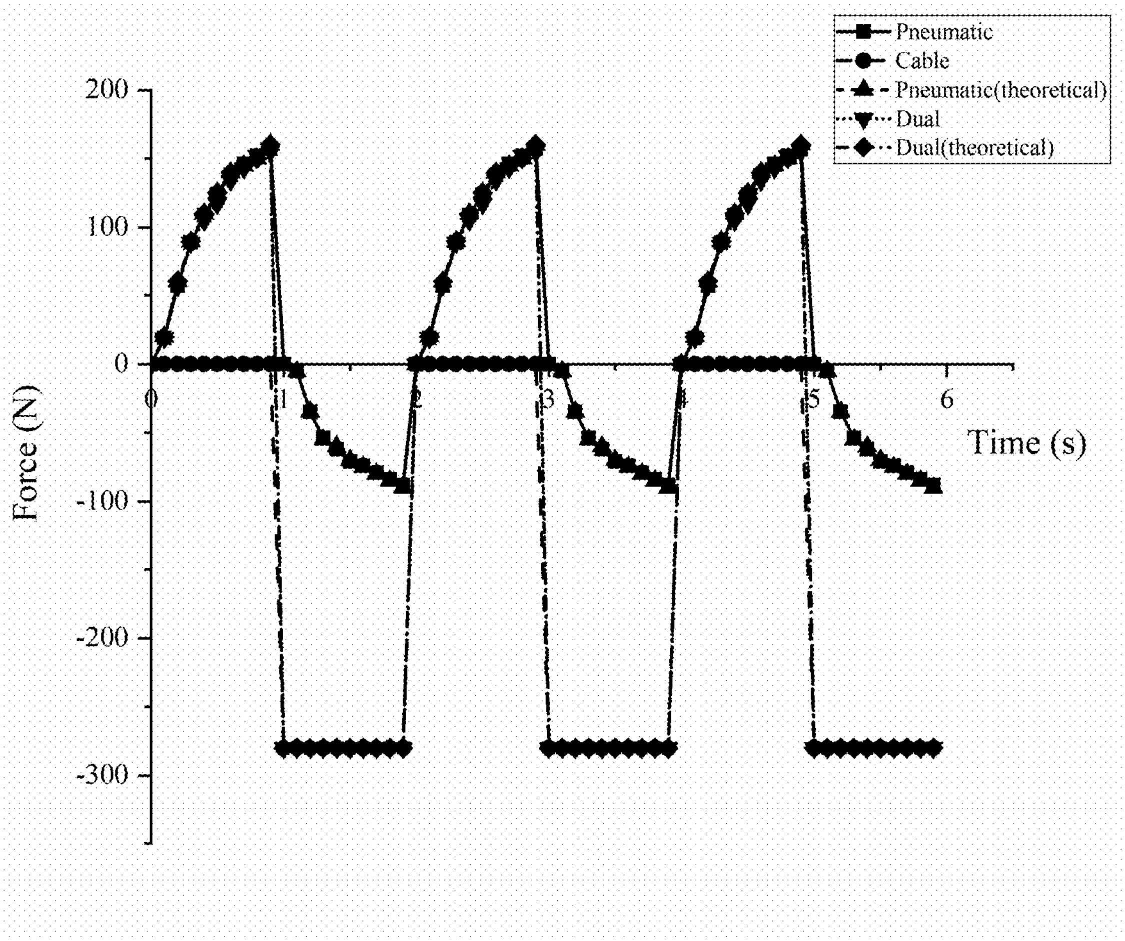
FIG. 11C shows the measurement results.
Figure 12A:
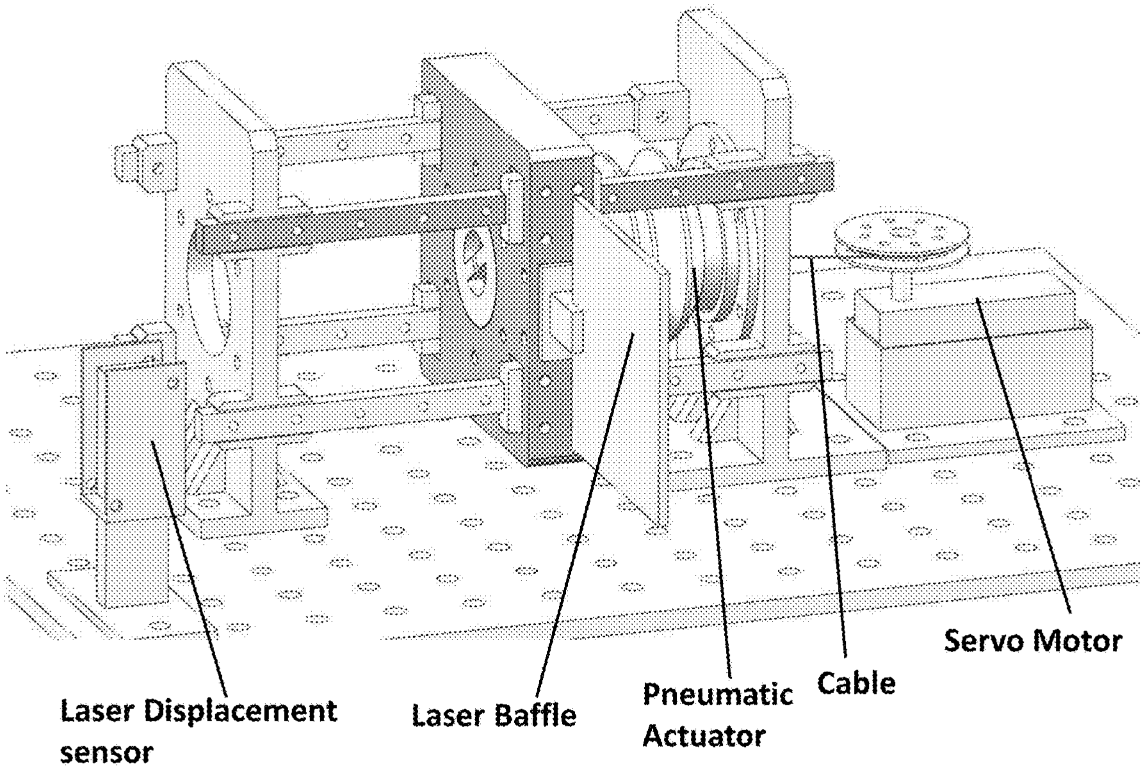
FIG. 12A shows a schematic diagram of an experimental setup for measuring displacement achieved by the artificial muscle protype under different operation modes.
Figure 12B:
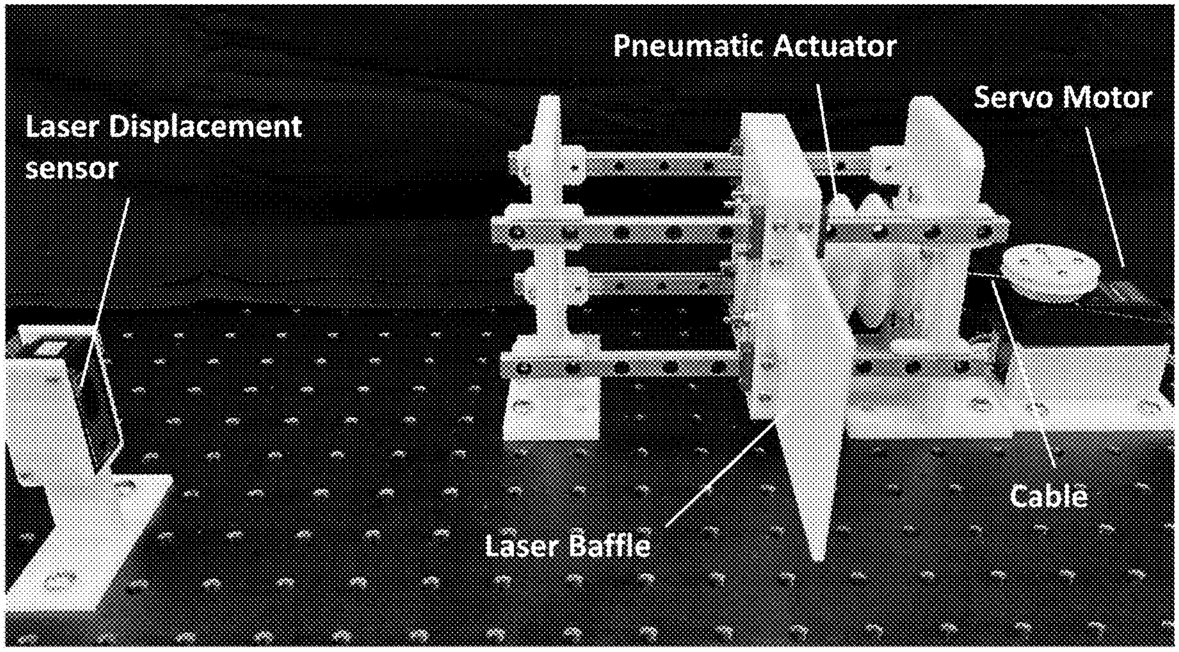
FIG. 12B shows a photo of the setup.
Figure 12C:
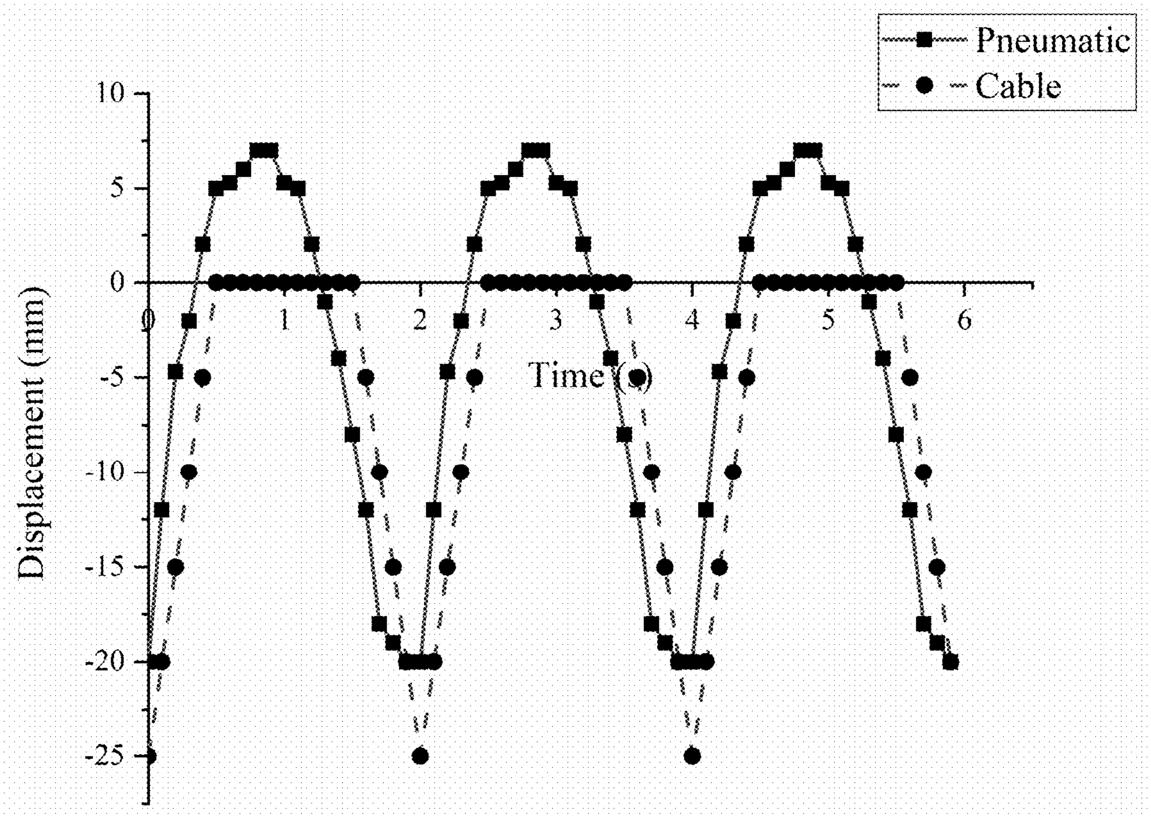
FIG. 12C shows the measurement results.

FIGS. 10A to 10D shows a prototype of the pneumatic actuator of an artificial muscle according to one embodiment of the present invention. FIG. 11A shows a schematic diagram of an experimental setup for measuring forces generated by the artificial muscle protype under different operation modes. FIG. 11B shows a photo of the setup and FIG. 11C shows the measurement results. As shown, when only pneumatic actuator is used, the maximum achieved pulling force is less than 100 N. When cable actuation assembly is also involved, the maximum pulling force can be increased to about 270 N. FIG. 12A shows a schematic diagram of an experimental setup for measuring displacement achieved by the artificial muscle protype under different operation modes. FIG. 12B shows a photo of the setup and FIG. 12C shows the measurement results. As shown, the cable actuation assembly cannot produce positive (or forward) displacement, that is, it cannot generate any thrust for actuation, whereas the pneumatic actuator can produce a forward displacement of about 7 mm.

The foregoing description represents exemplary embodiments of the present invention. However, it should be understood that the scope of the present invention is not limited to these embodiments, and any variations or substitutions that would be readily apparent to those skilled in the art within the technical scope disclosed in the present invention should be included within the scope of protection of the present invention. Therefore, the scope of protection of the present invention should be determined by the scope of the claims.

What is claimed is:

1. A pneumatic and cable-driven hybrid artificial muscle, characterized in comprising:
- a pneumatic actuator;
- a pneumatic pressure regulating assembly; and
- a cable actuation assembly; and
- wherein pneumatic pressure regulating assembly is connected to the pneumatic actuator to regulate air pressure in the pneumatic actuator for controlling the pneumatic actuator to extend or contract;
- the cable actuation assembly comprises a cable fixedly connected to the pneumatic actuator for controlling the pneumatic actuator to contract;
- the pneumatic actuator comprises an inner extending tube, an outer extending tube, a first sealing cap, and a second sealing cap;
- the inner extending tube is nested within the outer extending tube;
- each of the inner and outer extending tubes has a first end sealed with the first sealing cap and each of the inner and outer extending tubes has a second end sealed with the second sealing cap to form a closed air chamber;
- the inner extending tube has an inner cavity in connection with external atmosphere through a central through-hole on the second sealing cap;
- the pneumatic pressure regulating assembly is connected to the air chamber; and
- the cable of the cable drive assembly has one end fixedly connected to the first sealing cap.

2. The pneumatic and cable-driven hybrid artificial muscle according to claim 1, characterized in that:
- the second sealing cap comprises:
  - a circular groove opened from a surface of the second sealing cap proximal to the first sealing cap, located between the inner and outer extending tubes and being connected to the air chamber; and
  - an air hole located on a side wall of the second sealing cap and connected to the circular groove; and
- the pneumatic pressure regulating assembly is connected to the air hole.

3. The pneumatic and cable-driven hybrid artificial muscle according to claim 2, characterized in that: the pneumatic pressure regulating assembly includes a high-pressure pump connected to the air chamber for inflating air into the chamber and a vacuum pump connected to the chamber for evacuating air from the chamber.

4. The pneumatic and cable-driven hybrid artificial muscle according to claim 3, characterized in that:
- the pneumatic and cable-driven hybrid artificial muscle further includes a pneumatic duct assembly comprising a main air duct, a first branch air duct, and a second branch air duct;
- the main air duct is connected to the air hole;
- the high-pressure pump is connected to the main air duct through the first branch air duct;
- the first branch air duct has a high-pressure valve;
- the vacuum pump is connected to the main air duct through the second branch air duct; and
- the second branch air duct has a vacuum valve.

5. The pneumatic and cable-driven hybrid artificial muscle according to claim 4, characterized in that:
- the pneumatic duct assembly further includes a third branch air duct having a flow control valve;
- the main air duct is in connection with the external atmosphere through the third branch air duct.

6. The pneumatic and cable-driven hybrid artificial muscle according to claim 1, characterized in that:
- the cable actuation assembly further includes a motor; and
- the flexible cable passes through the central through-hole and has one end fixed to the motor and the other end fixed to the first sealing cap centrally.

7. The pneumatic and cable-driven hybrid artificial muscle according to claim 1, characterized in that both the inner and outer extending tubes are corrugated tubes.

8. The pneumatic and cable-driven hybrid artificial muscle according to claim 7, characterized in that both the inner and outer extending tubes are made of TPU material.

9. The pneumatic and cable-driven hybrid artificial muscle according to claim 7, characterized in that both the first sealing cap and second sealing cap are made of glass fiber-reinforced nylon material.

* * * * *